United States Patent

Faroudja

[15] 3,674,920

[45] July 4, 1972

[54] TIME BASE CORRECTION SYSTEM FOR VIDEO RECORDING APPARATUS

[72] Inventor: Yves C. Faroudja, Sunnyvale, Calif.

[73] Assignee: Data Memory, Inc., Mt. View, Calif.

[22] Filed: Sept. 14, 1970

[21] Appl. No.: 71,845

[52] U.S. Cl. ....................................178/5.4 CD, 178/6.6 A

[51] Int. Cl. ....................................................H04n 1/22

[58] Field of Search....................178/5.4 CR, 5.4, 5.2, 6.6 A; 179/100.2 S, 100.2 MI

[56] References Cited

UNITED STATES PATENTS

| | | | |
|---|---|---|---|
| 3,018,324 | 1/1962 | Lexton et al. | 178/5.4 CR |
| 3,488,452 | 1/1970 | Gunning et al. | 179/100.2 S |
| 3,506,777 | 4/1970 | Carlson | 178/5.4 CR |
| 3,507,983 | 4/1970 | Leman | 178/5.4 CR |

*Primary Examiner*—Robert L. Richardson
*Assistant Examiner*—Richard P. Lange
*Attorney*—Lowhurst & Hamrick

[57] ABSTRACT

A color correction system wherein a comb filter circuit and a heterdyne circuit are operatively interrelated to provide time base correction with de minimis reduction in luminance information. The comb filter portion of the circuit provides for the extraction and separation of chrominance and luminance information while the heterodyne portion provides time base correction of the unstable chrominance information. After stabilization, the chrominance signal is recombined with the luminance signal to reconstitute the composite video output signal.

7 Claims, 1 Drawing Figure

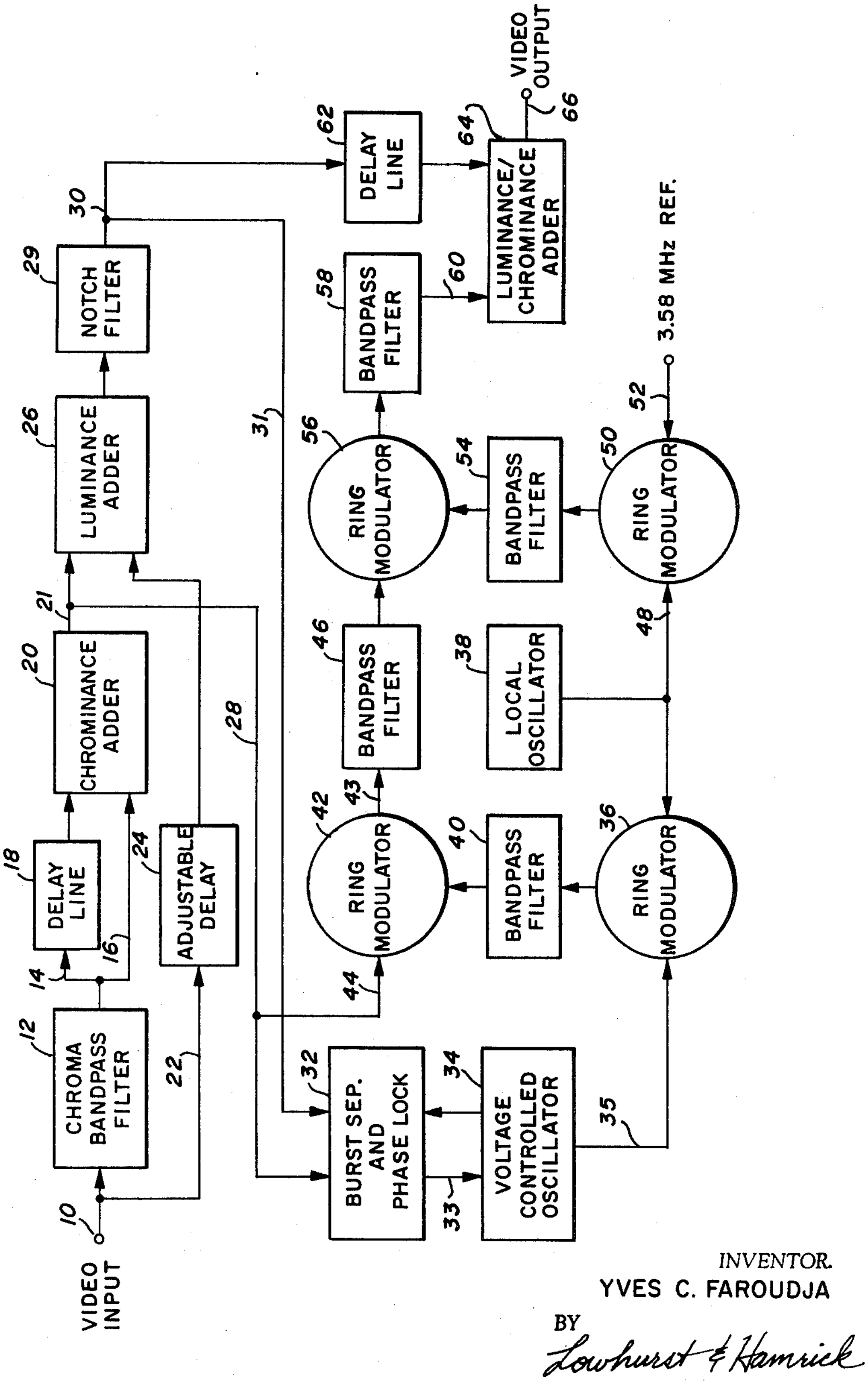
INVENTOR.
YVES C. FAROUDJA
BY
Lowhurst & Hamrick
ATTORNEYS

TIME BASE CORRECTION SYSTEM FOR VIDEO RECORDING APPARATUS

BACKGROUND OF THE INVENTION

The present invention relates generally to television signal processing apparatus and more particularly to a novel system for providing time base correction for recorded television signals without excessively reducing the luminance bandwidth.

All mechanical video recording systems utilizing rotating mechanical components to record and play back NTSC signals suffer from a time base instability problem because of the failure of the rotating elements to turn at a perfectly smooth rate. For example, in current video tape and disc recording devices, the time base of the recorded signal is altered as a result of the various inherent deficiencies in the mechanisms' bearings, drive motor stabilities, dynamic balances, etc., which all contribute to the playback time instability. With even the tightest servo control, a certain amount of time base displacement is evident in the reproduced signal of all modern video recording equipment.

Monochrome playbacks display this error in the form of horizontal jitter which is usually masked by the ARC circuit in the receiver. However, a more noticable effect is produced in the playback of color signals in that the hue of the video image is subjectively altered, and degrades the television picture. By way of example, 30 nanoseconds of instability in monochrome service does not produce noticable instability on the viewing screen, but a like instability in color service represents a hue shift of about 38.5° and is clearly unacceptable.

The NTSC system requires a time base accuracy on the order of 4 nanoseconds for accurate reproduction of the hue component of the composite color signal. This accuracy must be maintained irrespective of the cumulative errors of the record and playback mode of the recorder in order to meet both subjective acceptability and the FCC requirement that the chrominance part of the signal must be time base corrected before transmission.

A very stringent requirement is imposed upon a given system if it is to meet FCC specification. It is that the mathematical relationship of 455/2 between the color subcarrier frequency and the derived horizontal line rate, or scanning frequency, must be precisely retained; if this relation is respected, the dot interlace produced by precise alternate line subcarrier phase subversal will be held to a fairly tight tolerance and will avoid visible dot crawl. From a luminance viewpoint, it is desirable to retain as much of the high frequency luminance information as possible without generating unwanted moire since substantial luminance bandwidth reduction has the effect of causing the video image to appear out of focus on the viewing screen.

Heretofore, color slow motion disc recorders capable of meeting these requirements have utilized time base correction apparatus that depend upon electrically controlled variable delay lines to eliminate the displacement in the playback signal. One prior art device known as the AMTEC system can reduce gross time displacements with a correction range up to 1 microsecond. A subsequent system called COLORTEC further refines the time base accuracy by restoring the proper chrominance phase. These systems, however, are both expensive and highly complex, and the signal handling function includes the separation of chrominance and luminance components by a low pass and bandpass filter which limits the useful luminance response to well below that of the subcarrier frequency.

OBJECTS OF THE PRESENT INVENTION

It is therefore a primary object of the present invention to provide a novel system for time base correcting the chrominance portion of a recorded television signal without excessively reducing the luminance bandwidth thereof.

Another object of the present invention is to provide a novel time base correction system for television recording apparatus which utilizes a comb filter for the extraction of chrominance information and a heterodyne circuit for providing time base correction of the unstable chrominance information.

SUMMARY OF THE PRESENT INVENTION

In accordance with the present invention a comb filter circuit and a heterodyne circuit are operatively interrelated to provide chrominance time base correction with de minimis reduction in luminance bandwidth. The comb filter portion of the circuit provides for the extraction and separation of chrominance and luminance signals while the heterodyne portion provides time base correction of the unstable chrominance signal. After stabilization, the chrominance signal is recombined with the luminance signal to reconstitute the composite video output signal.

Among the many advantages of the present invention is that no material reduction in the luminance bandwidth is effected and thus the signal transitions are not unnecessarily reduced in rise time. By maintaining the luminance bandwidth at its maximum, sharp picture detail is maintained substantially unaffected by the time base correction operation.

Another advantage of the present invention is that time base correction and correct frequency relationship between subcarrier and horizontal line rate are established by the system in stop motion or slow motion playback of lapse time recordings without further luminance bandwidth degradation.

Other objects of the present invention will be apparent to those skilled in the art after having read the following detailed description of a preferred embodiment which is illustrated in the drawing.

IN THE DRAWING

The single FIGURE of the drawing is a block diagram functionally illustrating the operative characteristics of the present invention.

DETAILED DESCRIPTION OF A PREFERRED EMBODIMENT

All modern high quality television recording systems utilize some form of precision servo apparatus to achieve a high level of time base stability. However, notwithstanding the servo control, it is almost impossible to maintain the rotating disc in disc recorders, or the rotating video head in video tape recorders, at a constant rotational speed for the variety of reasons pointed out above. These rotating units have small variations about an average speed which cause time base instability in the reproduced video signal. The best nominal time base displacement which can be obtained from a presently available video recorder is approximately plus or minus 25 nanoseconds. This amounts to a cumulative peak-to-peak error of 50 nanoseconds which, of course, does not occur on an instantaneous basis, but builds up over a period of time based upon the mass and inertia of the rotating elements. An error of this magnitude is, however, more than the NTSC system can accommodate without evidencing a severe hue shift in the reproduced image. Therefore, additional means must be provided for electronically providing further time base correction.

Referring now to FIG. 1 of the drawing, a block diagram of a time base correction system in accordance with the present invention is illustrated. A television signal obtained from a video playback apparatus such as that referred to above is applied to the video input terminal 10 for passage through a chroma bandpass filter 12 which covers the chroma range of 2.8 to 4.2 megahertz. This filter is adequate to pass all of the chrominance components that exist around the subcarrier along with its side band in the 3.58 megahertz region. In addition, luminance components in that region are also passed.

The output of filter 12 is divided into two paths 14 and 16 with the path 14 containing a delay line 18 for delaying the signal by precisely one scanning line minus one-half of the color subcarrier period. The path 16 is direct and provides no delay. The delayed and undelayed signals in paths 14 and 16 are then applied to a chrominance adder circuit 20 in which the high frequency luminance components are cancelled by subtraction while the chrominance components are summed through addition, and then output as filtered chroma at 21. The efficiency of this circuit is dependent upon the very accurate tailoring of the one line delay to the center frequency of the subcarrier being used, and very precise line time. Using specially designed components, 30db or better luminance attenuation can be obtained in the chroma adder 20.

The full bandwidth video signal at input terminal 10 is also applied through a separate path 22 including an adjustable delay 24 for providing time equalization, and is simultaneously fed along with the output of chroma adder 20 into a luminance adder 26. The output of the luminance adder 26 consists of a relatively pure luminance signal from which the chrominance components have been substantially eliminated. However, vestigal chroma information may still appear in the output of adder 26 due to small unbalances in the system. Where this is the case, such components can be removed by notch filtering at the color subcarrier frequency. Ideally, the notch filter 29 should be an active device having a 3db bandwidth of not more than 3.2 to 3.9 megahertz so as not to cause substantial deterioration of the K-factor.

The unstable chroma information obtained from adder 20 and the separated luminance at 30 are applied via lines 28 and 31, respectively, to a burst separator and phase lock circuit 32 wherein the burst signal is extracted and used to control a voltage controlled oscillator (VCO) 34. The phase of oscillator 34 will be locked to remain in step with the phase variations of the burst signal recovered from the video input at terminal 10. These variations are those caused by the recorder time base instabilities. The time constant of the phase lock loop is on the order of four to five scanning lines.

The subcarrier output of oscillator 34 is phase modulated by the perturbations in the rotational components of the recorder system thereby producing a variable subcarrier of frequency $f_r$ which is applied to a ring modulator 36 into which is also fed the output of a local relatively stable oscillator 38 running at a frequency of $F_o$. Note that I have chosen to give the stable frequencies capital letter designations and the unstable frequencies lower case designations. The output of ring modulator 36 contains both the sum and the difference of the two applied frequencies and in this case the desired frequency is the sum frequency $(f_r + F_o)$ which is separated from the output of modulator 36 by a filter 40. Filter 40 has a relatively narrow pass band and serves to eliminate not only the difference frequency but also the second harmonic of the color subcarrier frequency.

The unstable sum frequency $(f_r + F_o)$ is then applied to one input of a second ring modulator 42, the other input 44 of which is receiving the unstable chroma signal $f_r$ recovered from the chroma adder 20. The output from ring modulator 42 now contains sum and difference signals as well but there is a significant change here. Since the outputs of the two signal sources, i.e., the chroma adder 20 and the ring modulator 36, are both unstable in the same direction and with the same magnitude, the intermodulation between the two signals produces a stable output since the instabilities are self-cancelling. Therefore, the output signals at 43 are frequency stable. In this case, the desired output signal from modulator 42 is the difference signal $[(f_r + F_o)-F_r]$ which equals $F_o$, and a filter 46 having a relatively narrow pass band is inserted in the output for selecting only this signal.

However, the now stabilized chroma signal $F_o$ available at the output of filter 46 is at the wrong frequency and with inverted side bands so an additional heterodyne modulation process is needed to restore it to the NTSC color subcarrier frequency of 3.57945 megahertz. This is accomplished by applying the signal $F_o$ from local oscillator 38 to a third ring modulator 50 at input 48 for mixing with a stable reference subcarrier $F_{sc}$ at 3.58 megahertz. Since both inputs to modulator 50 are stable, the output thereof will also be stable and have a sum frequency of $(F_o + F_{sc})$.

A bandpass filter 54 is used to eliminate the undesired modulation products and the stable sum signal is applied to a fourth ring modulator 56 wherein it is mixed with the now stabilized chroma signal $F_o$ obtained from modulator 42 through filter 46. The difference frequency in the output of modulator 56 is now equal to $[(F_o + F_{sc})-F_o]$, or $F_{sc}$, which is the subcarrier frequency of 3.58 megahertz and can be separated from the modulator output by a filter 58.

The corrected color subcarrier and chrominance information now available at the output 60 of filter 58, and the luminance signal from adder 26 (delayed by 1 microsecond by a delay means 62 to provide coincidence timing with the time base stabilized chroma signal) are now added in a luminance/chrominance adder 64 from which the composite NTSC stabilized video signal is obtained at the system output terminal 66. This output signal can now be applied to a processing amplifier for independent reinsertion and control of each of the separate video signal entities.

As a specific example of the operation of one embodiment of the present invention, the video input at terminal 10 may be taken from a video disc recorder, such as the DMI VIDEODISC 1,000, which has a nominal time base displacement of approximately plus or minus 25 nanoseconds providing a cumulative peak-to-peak of 50 nanoseconds. For purposes of this analysis, an additional 50 percent error may be allowed with the assumption being made that a maximum peak-to-peak error of 75 nanoseconds might occur. This error, of course, does not occur on an instantaneous basis but builds up over a period of time based upon the mass and inertia of the disc itself. The maximum rate at which the error can possibly occur is on the order of 400 cycles and consequently, the maximum time base displacement over a given television line is never in excess of 12 nanoseconds. This, however, is more than the NTSC system can accommodate without severe hue shift in the reproduced image and the electronic correction system of the present invention is utilized to correct this time base instability.

With the recorder output applied to bandpass filter 12, the chrominance components that exist around the subcarrier and its side band in the 3.58 megahertz region, along with the luminance components in that region, are separated from the input signal and applied to the parallel lines 14 and 16. The signal through line 14 is delayed by 63.5 microseconds and then added along with the undelayed signal on line 16 to the chroma adder 20. It should be noted that the one line scanning delay minus one-half the period of the subcarrier provided by delay 18 will cause the signals input to chroma adder 20 to be in-phase but the luminance components on the high end will be in phase opposition so that the output at 21 of chroma adder 20 will have the correct chroma information but no luminance information.

The composite video signal at input terminal 10 is delayed for one-half microsecond by the delay 24 and fed along with the output of adder 20 into the luminance adder 26 which subtracts the chroma from the composite video so that a theoretically pure luminance signal free of chroma appears on line 27. Practically, however, as pointed out above, there are some elements of chroma information remaining in the output of adder 26 which are due to unbalances in the circuit and differences in information content of two successive lines. In addition, the delay line 24 may also be limited somewhat in bandwidth so that the low frequencies of the chroma spectrum will not be entirely subtracted in the luminance adder. Therefore, it is likely that some low frequency chroma will appear in the output. These signal components are particularly disturbing in the case of slow motion or stop motion applications because they produce a 15 cycle flicker.

In order to avoid the passage of this chroma information through the system, a chroma trap in the form of a notch filter 29 is added to the output of the luminance adder 26 so as to reduce the presence of any residual subcarrier to an unnoticable level. Although a simple trap can be used, an active notch filter network provides the better solution and enables a wider luminance bandwidth to be obtained.

The outputs of the adders 20 and 26 are then fed through lines 28 and 31 to the burst separator and phase lock means 32 which compares the phase of the subcarrier from the VCO 34 with the burst, and generates a DC signal at 33 which is proportional to the phase error. This DC signal then acts to change the frequency of VCO 34 so that the output frequency thereof is identical to the burst frequency, i.e., unstable 3.58 megahertz. Note that the output 33 of phase lock means 32 will be identical to output 35 of VCO 34.

The unstable 3.58 megahertz signal is then applied to the ring modulator 36 and modulated with a stable 5.75 megahertz signal from local oscillator 38 to produce an unstable sum output signal of 9.33 megahertz which is separated from the total output of ring modulator 36 by the filter 40 which has a 7.7 to 10.4 pass band. The unstable 9.33 megahertz signal is then fed into ring modulator 42 along with the unstable 3.58 megahertz signal at 44. Since the two signals are unstable in the same direction and with the same magnitude, the intermodulation between the two produces a stable difference output of 5.75 megahertz which may be separated from the total output of modulator 42 by a filter 46 having a pass band of 4.7 to 7 megahertz. But, even though stabilized, this 5.75 megahertz signal is now at the wrong subcarrier frequency and with inverted side bands.

Thus, an additional heterodyning operation is used to restore the frequency of the NTSC color subcarrier frequency of 3.58 megahertz. This is accomplished by feeding the 5.75 megahertz output of local oscillator 38 along with a stable studio reference subcarrier of 3.58 megahertz into the ring modulator 50 and providing a filter 54 having a pass band of 7.7 to 10.4 megahertz in the output thereof so as to pass only the sum frequency of 9.33 megahertz. The stable 9.33 megahertz signal and the 5.75 megahertz signal obtained at the output of filter 46 are then fed into ring modulator 56. A filter 58 having a bandpass of 2.4 to 4.7 megahertz is used to separate out the time corrected 3.58 megahertz chroma signal. The chroma signal at 60 and the luminance signal from adder 26 (delayed by 1 microsecond) are then fed into the adder 64 wherein the composite video signal is reconstructed.

The present invention has particular applicability to stop-motion and slow motion disc recording apparatus having an initial, relatively good time base stability. For systems having relatively poor time base stability, certain adaptations of the system may be made in order to accommodate the higher instability of the input signals. The time base correction and wide luminance bandwidth features provided by the present invention provide substantial improvement over the prior art systems.

Although a single embodiment of the present invention has been herein disclosed, it is to be understood that this description is for purposes of illustration only and is not to be considered as limiting. I intend that the appended claims be interpreted as covering not only the herein disclosed embodiment, but also all modifications thereof which fall within the true spirit and scope of the invention.

What is claimed is:

1. An electronic time base correction system for use with video recording apparatus comprising:
   filter means including, a comb filter for receiving and separating out the luminance and chrominance information from an input composite video signal to provide an unstable chrominance signal and a luminance signal, said comb filter including, a chrominance bandpass filter, a 63.36 microsecond signal delay means, a chrominance adder for developing said unstable chrominance signal having a first input terminal coupled to the output of said chrominance bandpass filter through said 63.36 microsecond delay means and a second input terminal coupled directly to the output terminal of said chrominance bandpass filter, an adjustable delay means, and a luminance adder for developing said luminance signal having one input terminal coupled to the output terminal of said chrominance adder and another input terminal for receiving said input composite video signal after it is delayed by said adjustable delay means;
   heterodyning means responsive to said unstable chrominance signal for developing a stabilized chrominance signal; and
   signal adder means responsive to said stabilized chrominance signal and said luminance signal for developing a time base stabilized composite video signal.

2. An electronic time base correction system as recited in claim 1 and further including an active notch filter coupling said luminance adder to said signal adder means for removing any vestigal chrominance components from said luminance signal.

3. An electronic time base correction system as recited in claim 2 and further including a 1 microsecond signal delay means coupling said notch filter to said signal adder means for delaying said luminance signal prior to addition with said stabilized chrominance signal.

4. An electronic time base correction system for use with video recording apparatus comprising:
   filter means for receiving and separating out the luminance and chrominance information from an input composite video signal to provide an unstable chrominance signal and a luminance signal;
   heterodyning means responsive to said unstable chrominance signal for developing a stabilized chrominance signal, said heterodyning means including a voltage controlled oscillator for developing an unstable subcarrier signal which is phase-locked with said unstable chrominance signal, and modulator means responsive to said unstable subcarrier signal and said unstable chrominance signal for developing said stabilized chrominance signal; and
   signal adder means responsive to said stabilized chrominance signal and said luminance signal for developing a time base stabilized composite video signal.

5. An electronic time base correction system as recited in claim 4 wherein said modulator means includes a local oscillator for developing a stable reference signal, a first ring modulator means responsive to said unstable subcarrier signal and said stable reference signal for developing an unstable sum output signal, a second ring modulator means responsive to said unstable chrominance signal and said unstable sum output signal for developing a stable difference output signal, a third ring modulator means responsive to a stable subcarrier signal and said stable reference signal for developing a stable sum output signal, and a fourth ring modulator means responsive to said stable difference output signal and said stable sum output signal for developing said stabilized chrominance signal.

6. An electronic time base correction system as recited in claim 1 wherein said heterodyning means includes a voltage controlled oscillator for developing an unstable subcarrier signal which is phase locked with said unstable chrominance signal, and modulator means responsive to said unstable subcarrier signal and said unstable chrominance signal for developing said stabilized chrominance signal.

7. An electronic time base correction system as recited in claim 6 wherein said modulator means includes a local oscillator for developing a stable reference signal, a first ring modulator means responsive to said unstable subcarrier signal and said stable reference signal for developing an unstable sum output signal, a second ring modulator means responsive to said unstable chrominance signal and said unstable sum output signal for developing a stable difference output signal, a third ring modulator means responsive to a stable subcarrier signal and said stable reference signal for developing a stable sum output signal, and a fourth ring modulator means responsive to said stable difference output signal and said stable sum output signal for developing said stabilized chrominance signal.

* * * * *